United States Patent
Gucea

(10) Patent No.: US 10,939,371 B2
(45) Date of Patent: Mar. 2, 2021

(54) POWER SAVE OPTIMIZATION FOR WIRELESS CONNECTIVITY

(71) Applicant: NXP USA, Inc., Austin, TX (US)

(72) Inventor: Doru Cristian Gucea, Bragadiru Village (RO)

(73) Assignee: NXP USA, Inc., Austin, TX (US)

( * ) Notice: Subject to any disclaimer, the term of this patent is extended or adjusted under 35 U.S.C. 154(b) by 183 days.

(21) Appl. No.: 16/263,084

(22) Filed: Jan. 31, 2019

(65) Prior Publication Data

US 2020/0107260 A1 Apr. 2, 2020

(30) Foreign Application Priority Data

Sep. 28, 2018 (RO) .............................. a 2018 00756

(51) Int. Cl.
| | |
|---|---|
| *H04W 52/02* | (2009.01) |
| *H04W 76/11* | (2018.01) |
| *H04W 40/24* | (2009.01) |
| *H04W 28/06* | (2009.01) |
| *H04W 72/04* | (2009.01) |

(52) U.S. Cl.
CPC ....... *H04W 52/0206* (2013.01); *H04W 28/06* (2013.01); *H04W 40/244* (2013.01); *H04W 52/0216* (2013.01); *H04W 52/0229* (2013.01); *H04W 72/0446* (2013.01); *H04W 76/11* (2018.02)

(58) Field of Classification Search
CPC ... Y02D 30/70; H04W 52/0216–0219; H04W 52/0235
See application file for complete search history.

(56) References Cited

U.S. PATENT DOCUMENTS

| | | | | |
|---|---|---|---|---|
| 2016/0112955 | A1* | 4/2016 | Grau ................ | H04W 52/0235 370/311 |
| 2016/0277957 | A1* | 9/2016 | Patel ................ | H04W 52/0229 |
| 2016/0323823 | A1* | 11/2016 | Ryoo .................... | H04W 4/08 |
| 2018/0220372 | A1* | 8/2018 | Homchaudhuri ... | H04W 52/226 |
| 2018/0227847 | A1* | 8/2018 | Butt ................. | H04W 52/0216 |

OTHER PUBLICATIONS

D. C. Gucea, "Energy Saving for Multiple Wireless Connectivity," University Politehnica of Bucharest, Masters Thesis, 2017; 42 pagesctivity.

Croitoru et al., "Towards Wifi Mobility without Fast Handover," 12th USENIX Symposium on Networked Systems Design and Implementation (NSDI '15), May 4-6, 2015; 17 pages.

* cited by examiner

*Primary Examiner* — Marcus Smith

(57) ABSTRACT

A method for power save optimization includes a wireless station receiving a beacon frame from an Access Point (AP), wherein the beacon frame comprises a Traffic Indication Map (TIM) including an Association Identifier (AID) flag corresponding to the wireless station. The wireless station transmits to the AP, a first NULL frame with a Power Save (PS) flag cleared to represent an AWAKE state if the AID flag is TRUE, otherwise the PS flag is set to represent a DEEP SLEEP state. The wireless station receives at least a portion of a data from the AP in response to the AP receiving the first NULL frame during the AWAKE state. The wireless station transmits to the AP, a second NULL frame with the PS flag set to represent the DEEP SLEEP state in response to the wireless station receiving all of the data.

21 Claims, 4 Drawing Sheets

POWER SAVE OPTIMIZATION FOR WIRELESS CONNECTIVITY

CROSS-REFERENCE TO RELATED APPLICATIONS

This application claims the priority under 35 U.S.C. § 119 of Romania patent application no. A201800756, filed Sep. 28, 2018 the contents of which are incorporated by reference herein.

FIELD

This disclosure relates generally to reducing the power consumption of wireless devices, and more specifically to reducing the power consumption of Multi-Channel Multiple Wireless Connectivity (MWC) devices.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Multiple Wireless Connectivity (MWC) is a technology that allows a mobile device to initiate and maintain multiple parallel connections using a single physical wireless card. Multiple virtual interfaces are time-shared with the physical interface to realize the multiple parallel connections. Many smartphones have incorporated MWC technology.

For example, many Android™ smartphones can simultaneously provide a standard IEEE 802.11 Wi-Fi connection and a Wi-Fi Direct connection by maintaining a connection to a regular Access Point and a connection to a Wi-Fi Direct Group Owner (e.g., P2P-GO). In another example, Multi-Wi-Fi technology is used to allow a mobile device to start and maintain multiple IEEE 802.11 connections. However, existing MWC technology does not deactivate connections between the wireless card and Access Points when multiple channels are used. Furthermore allocation between parallel connections or channels is fixed, rather than being traffic dependent.

Embodiments of systems and methods described herein provide for a reduction in average power consumption of an MWC device by selectively alternating between AWAKE and DEEP SLEEP states of connections between a wireless station (e.g., a mobile device or similar battery powered wireless device), and a wired Access Point (AP), or similar device employing an IEEE 802.11 protocol. An AWAKE state enables the wireless card of the wireless station to send and receive data packets with a Transceiver and to detect (e.g., "sniff") data packets within detection range of the wireless station. A DEEP SLEEP state disables most of the circuitry of the wireless station, with the exception of certain hardware timers and clocks required for the wireless station to periodically enter the AWAKE state.

By selectively transitioning between the AWAKE and DEEP SLEEP states the amount of time that a particular channel is active on the wireless station is proportional to the traffic volume on that channel. Therefore one channel on a multi-channel MWC connection will not have disproportionate access to the wireless station. The disclosure herein is implemented on the client side, or wireless station, without requiring any changes to the AP.

Figure 1:
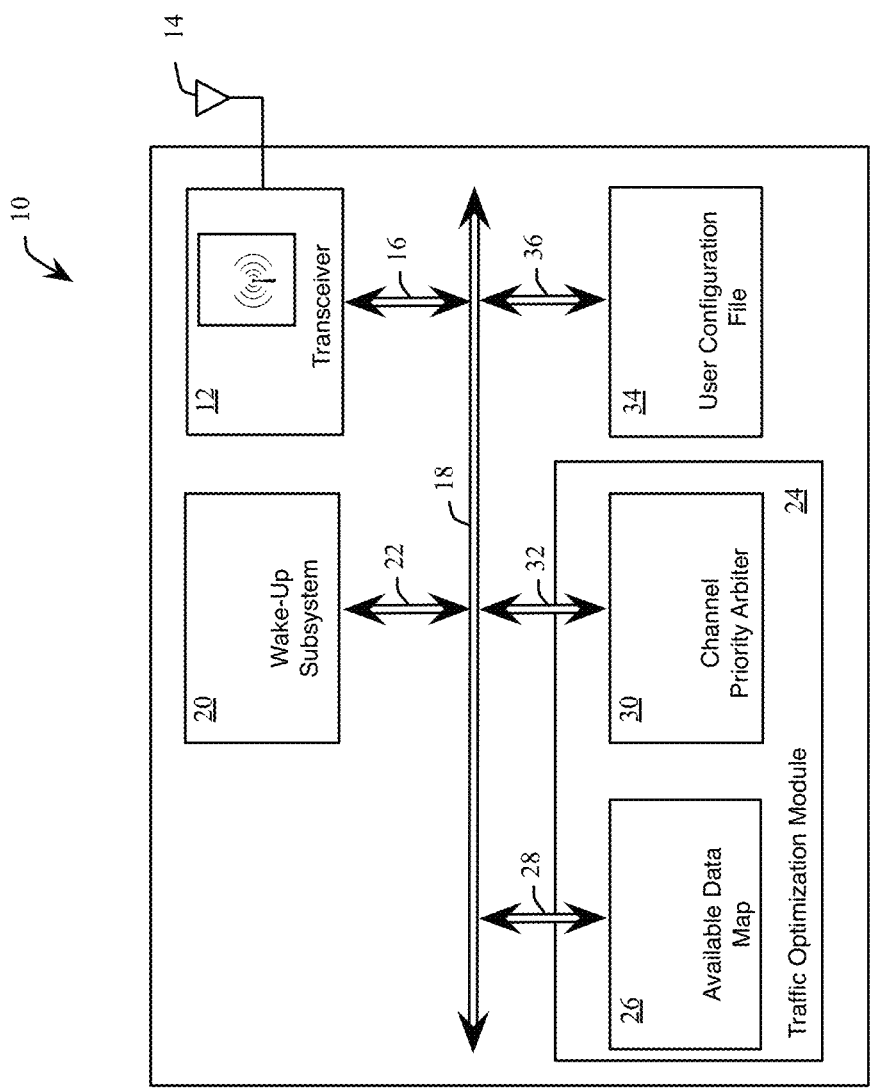
FIG. 1 is a functional block view of a wireless station for power save optimization in accordance with an example embodiment of the present disclosure.

FIG. 1 shows a wireless station 10 for power save optimization in accordance with an embodiment of the present disclosure. The wireless station 10 includes a transceiver 12 connected to an antenna 14. The transceiver 12 includes a transmitter and receiver capable of operating with the antenna 14 on a wireless frequency, for example a Wi-Fi frequency. The transceiver 12 is connected with a connection 16 to a shared connection 18. The transceiver 12 can either be in the AWAKE state or in the DEEP SLEEP state. The transceiver 12 transitions to the AWAKE state in response to a wake-up event, also defined as a Power Save (PS) flag cleared to a zero value. Similarly, the transceiver 12 will transition to the DEEP SLEEP state when the PS flag is set to a one value.

The wireless station 10 includes a wake-up subsystem 20 connected to the shared connection 18 through connection 22. The wake-up subsystem 20 is continuously powered and generates wake-up events to prompt the wireless station 10 to search (e.g., "sniff") for AP beacons on a specific Wi-Fi channel. The input parameters used by the wake-up subsystem 20 to generate the wake-up event include a channel, a listen interval (e.g. "periodicity") and a first trigger time. In one example, the channel corresponds to a Wi-Fi channel defined by an IEEE 802.11 protocol. In another example, a channel number 6 corresponds to a center frequency of 2.437 GHz. The listen interval is defined as a timing interval between two consecutive wake-up events. The first trigger time is the time that the wake-up event first triggers as a result of the wireless station 10 sniffing an initial AP beacon. The AP beacon includes a Traffic Indication Map (TIM) having an Association Identifier (AID) flag corresponding to the wireless station. The initial AP beacon has the AID set to a FALSE value to indicate there is no buffered data at the AP for the wireless station 10 to receive.

The wireless station 10 further includes a Traffic Optimization Module 24 comprising an Available Data Map 26 connected to the shared connection 18 by connection 28, and a Channel Priority Arbiter 30 connected to the shared connection 18 by connection 32. The Available Data Map 26 includes a list of channel number flags for each AP channel that the wireless station 10 is communicating with. Setting a channel number flag to a TRUE state indicates the AP transmitting on that channel has pending data that has been stored but not yet received by the wireless station 10. For example, when the wireless station 10 begins to receive data from the AP but needs to suspend the receipt of the data, the corresponding channel number flag is set to a TRUE state to indicate that the data receipt was incomplete. Before the wireless station 10 enters the DEEP SLEEP state, each of the channel number flags are checked to be in the FALSE state to indicate no further pending data is available from the various APs communicating with the wireless station 10.

If there are multiple channels that have pending data for the wireless station 10, the Channel Priority Arbiter 30 defines the order in which the pending data are received. In one example embodiment, the order is predefined by a user of the wireless station 10. The wireless station 10 further includes a User Configuration File 34 connected to the shared connection 18 with connection 36. The User Configuration File 34 is used during an initial scanning phase of all wireless transmits scanned by the wireless station 10, to define a list of a plurality of APs meeting one or more criteria defined by the User Configuration File 34. In various embodiments, the criteria includes a signal strength, a channel and a Service Set Identifier (SSID). In one embodiment, the signal strength is measured as a minimum required signal strength received by the wireless station 10. In one embodiment, the channel corresponds to an IEEE 802.11 Wi-Fi channel. In another embodiment, the SSID is predefined by the user of the wireless station 10.

In various embodiments, one or more of the Transceiver 12, the Wake-up Subsystem 20, and the Traffic Optimization Module 24 have respective state machines for controlling the execution of transitioning between the AWAKE and the DEEP SLEEP states, scanning, and authenticating APs and receiving data therefrom. In another embodiment, a processor (not shown) communicates with the shared connection 18 to control the execution of states for the wireless station 10. It should be understood that in some example embodiments of the wireless station 10, point-to-point connections are used between the functional modules shown in FIG. 1, rather than using the shared connection 18.

Figure 2:
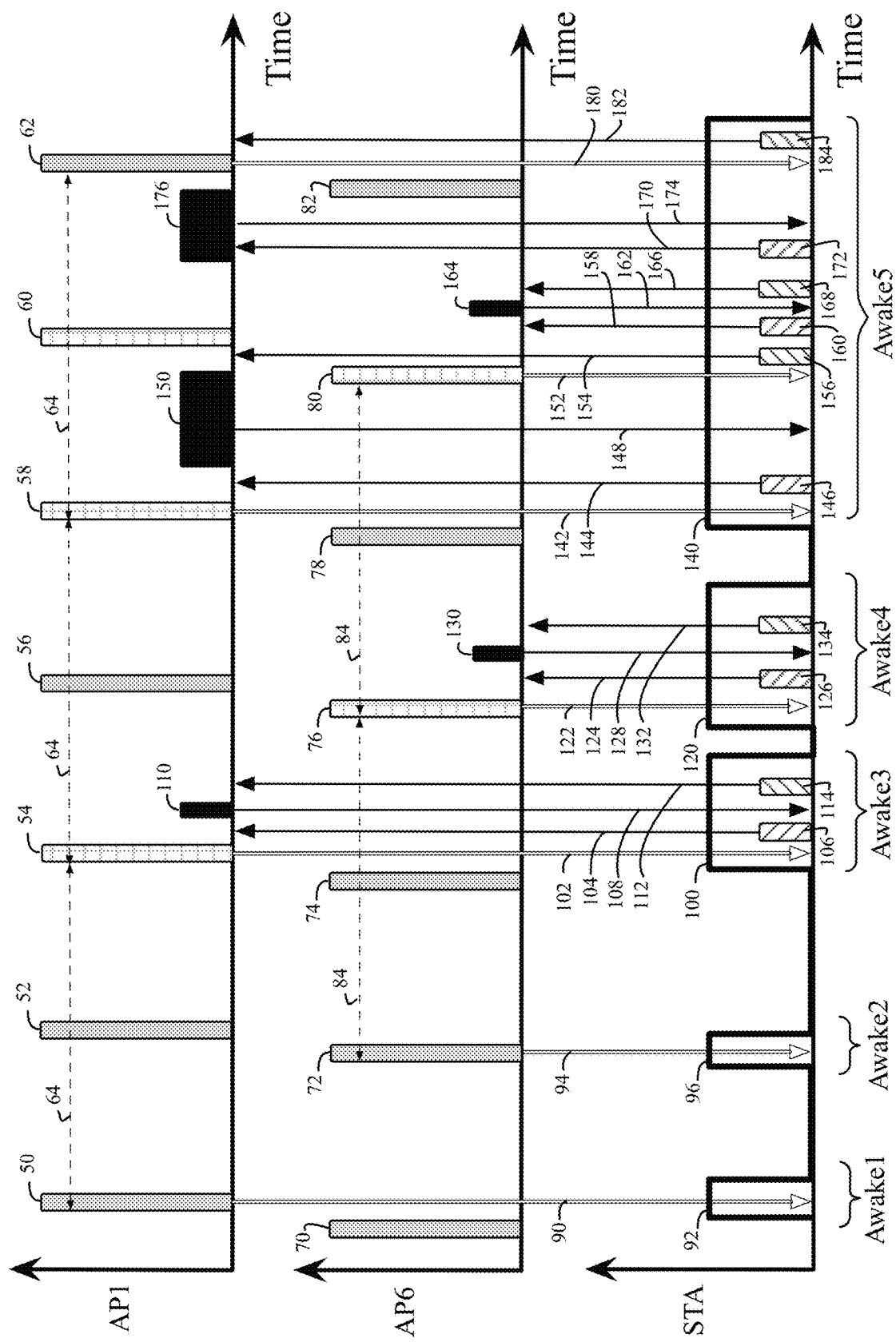
FIG. 2 is a graphical view of a communication between a wireless station and two access points for power save optimization in accordance with an example embodiment of the present disclosure.

FIG. 2 shows a timeline of communication between a wireless station 10 (STA), a first AP operating on channel 1 (AP1) and a second AP operating on channel 6 (AP6), in accordance with an example embodiment. In various embodiments, the wireless station 10 enters the AWAKE state and initially scans all available IEEE 802.11 based networks, thereby producing a list of potential networks for connection. The list of potential networks is then compared against one or more criteria in the User Configuration File 34 to determine a final list of APs to form the MWC network. For example, in FIG. 2 the list of available networks satisfying the criteria of the User Configuration File 34 is AP1 and AP6.

Following the initial scan, while continuing to remain in the AWAKE state, the communication between the wireless station 10 and the two APs proceeds to an authentication phase. AP6 transmits an initial beacon frame (not shown) to the wireless station 10. The wireless station 10 extracts a channel, a listen interval 84 and a first trigger time defining when the first beacon from AP6 was received by the wireless station 10, and stores the same in a register or memory (not shown) of the Wake-Up Subsystem 20. The wireless station 10 then transmits a NULL frame with the PS flag set to one to cause AP6 to begin buffering data, however the wireless station 10 remains in the AWAKE state, contrary to the setting of the PS flag. AP1 transmits an initial beacon frame (not shown) to the wireless station 10. The wireless station 10 extracts a channel, a listen interval 64 and a first trigger time defining when the first beacon from AP1 was received by the wireless station 10, and stores the same in a register or memory (not shown) of the Wake-Up Subsystem 20. The wireless station 10 then transmits a NULL frame with the PS flag set to one to cause AP1 to begin buffering data. Once the final list of APs defined during the initial scan have been configured, the wireless station 10 then returns to the DEEP SLEEP state.

The AP1 sequentially transmits beacons 50, 52, 54, 56, 58, 60 and 62. After the expiration of the listen interval 64 following the first trigger time for AP1, the wireless station 10 enters the AWAKE state with the first AWAKE event 92 and receives a first beacon frame 90 from the first beacon 50. The wireless station 10 determines that the AID flag received with the first beacon frame 90, is not set and thus returns to the DEEP SLEEP state.

The AP6 sequentially transmits beacons 70, 72, 74, 76, 78, 80 and 82. After the expiration of the first interval 84 following the first trigger time for AP6, the wireless station 10 enters the AWAKE state with the first AWAKE event 96 and receives a first beacon frame 94 from the first beacon 72. The wireless station 10 determines that the AID flag received with the first beacon frame 94, is not set and thus returns to the DEEP SLEEP state.

Following the elapse of the listen interval 64 from the first beacon 50, the wireless station 10 awakes in response to a third AWAKE event 100. The beacon 54 includes a TIM with an AID flag set to correspond to the wireless station 10. In other embodiments having more than one wireless station 10, a plurality of AID flags are used to define which wireless station is intended to receive a particular beacon frame from a respective AP. During the AWAKE state, the wireless station 10 receives a beacon frame 102 from the beacon 54 of AP1. The wireless station 10 responds to the beacon frame 102 with a transmission 104 having a NULL frame 106 sent to AP1. The NULL frame 106 has a PS flag cleared to zero, indicating that the wireless station 10 is in the AWAKE state. In response to the NULL frame 106, AP1 transfers data 110 with a transmission 108 to the wireless station 10. After the data 110 has been received by the wireless station 10, a NULL frame 114, having the PS flag set to one, is sent to AP1 with a transmission 112 to inform AP1 that the wireless station 10 will transition to the DEEP SLEEP state.

Following the elapse of the listen interval 84 from the first beacon 72, the wireless station 10 awakes in response to a fourth AWAKE event 120. Similar to the AWAKE event 100, an AWAKE event 120 occurs in response to the wireless station 10 receiving a beacon frame 122 from the beacon 76 of AP6. The wireless station 10 responds to the beacon frame 122 with a transmission 124 having a NULL frame 126 sent to AP6. The NULL frame 126 includes a PS flag cleared to zero, indicating that the wireless station 10 is in the AWAKE state. In response to the NULL frame 126, AP6 transfers data 130 with a transmission 128 to the wireless station 10. After the data 130 has been received by the wireless station 10, a NULL frame 134, having the PS flag set to one, is sent to AP6 with a transmission 132 to inform AP6 that the wireless station 10 will transition to the DEEP SLEEP state. In various embodiments, a TIMEOUT delay is inserted between receipt of the data 110 or 130 and the transmission of the respective NULL frames 114 and 134 to minimize transitions between the AWAKE and DEEP SLEEP states. For example, if the TIMEOUT delay is greater than a time when AP1 has stopped sending the data 110 and the time when the beacon frame 122 is received, then the wireless station 10 will remain in the AWAKE state. In one embodiment, the TIMEOUT delay is ten milliseconds. In other embodiments, the TIMEOUT delay depends upon which 802.11 Wi-Fi protocol is used (e.g., a, b, g, n or ac).

Following the elapse of the listen interval 64 from the beacon 54 (e.g., at beacon 58), the wireless station 10 awakes in response to a fifth AWAKE event 140. In contrast to the third AWAKE event 100 and fourth AWAKE event 120, the fifth AWAKE event 140 involves a conflict between AP1 and AP6 requesting data transfer in a same time frame.

In response to the beacon frame 142 from the beacon 58, the wireless station 10 sends a NULL frame 146 to AP1 with a transmission 144. The NULL frame 146 includes a PS flag cleared to zero, to indicate the AWAKE state. In response to AP1 receiving the NULL frame 146, AP1 transmits a data portion 150 with a transmission 148. The data stored by AP1 includes the portion of data 150 and the remainder of data 176.

Prior to the wireless station 10 receiving all of the stored data from AP1 (e.g., only the portion of the data 150 is received), the beacon 80 from AP6 generates a beacon frame 152 in response to the expiration of the listen interval 84 extending from beacon 76. In response to the beacon frame 152, the wireless station 10 transmits to AP1 with transmission 154, a NULL frame 156 having with the PS flag set to one to cause AP1 to respond as if the wireless station 10 entered the DEEP SLEEP state, and thereby suspend further data transfer.

Subsequently, the wireless station 10 receives the stored data from AP6 prior to resuming data receipt by AP 1. Specifically, the wireless station 10 transmits to AP6 with transmission 158 a NULL frame 160 having the PS flag cleared to zero to indicate the AWAKE state. The wireless station 10 receives the data 164 with transmission 162. Once the data 164 has been received, the wireless station 10 transmits with transmission 166 a NULL frame 168 having the PS flag set to one to indicate the DEEP SLEEP state. In one embodiment, a TIMEOUT delay is inserted between receipt of the data 164 and the transmission of the NULL frame 168, to reduced the probability that the wireless station 10 will unnecessarily transition to the DEEP SLEEP state prior to returning the AWAKE state to receive the remainder of data 176.

The receipt of data from AP1 resumes by the wireless station 10 transmitting to AP1 with transmission 170 a NULL frame 172 having the PS flag cleared to zero to indicate the AWAKE state. The wireless station 10 receives the remainder of the data 176 with transmission 174. In one embodiment, the wireless station 10 transmits a NULL frame to AP1 to indicate that the data was received and the wireless station 10 will enter the DEEP SLEEP state. In another embodiment, as shown in FIG. 2, a subsequent beacon 62 from AP1 transmits a beacon frame 180 including a TIM with an AID flag cleared to inform the wireless station 10 that no further data has been stored for this station by AP1. In response to the beacon frame 180, the wireless station 10 transmits with transmission 182 a NULL frame 184 having the PS flag set to one to indicate the DEEP SLEEP state.

Figure 3:
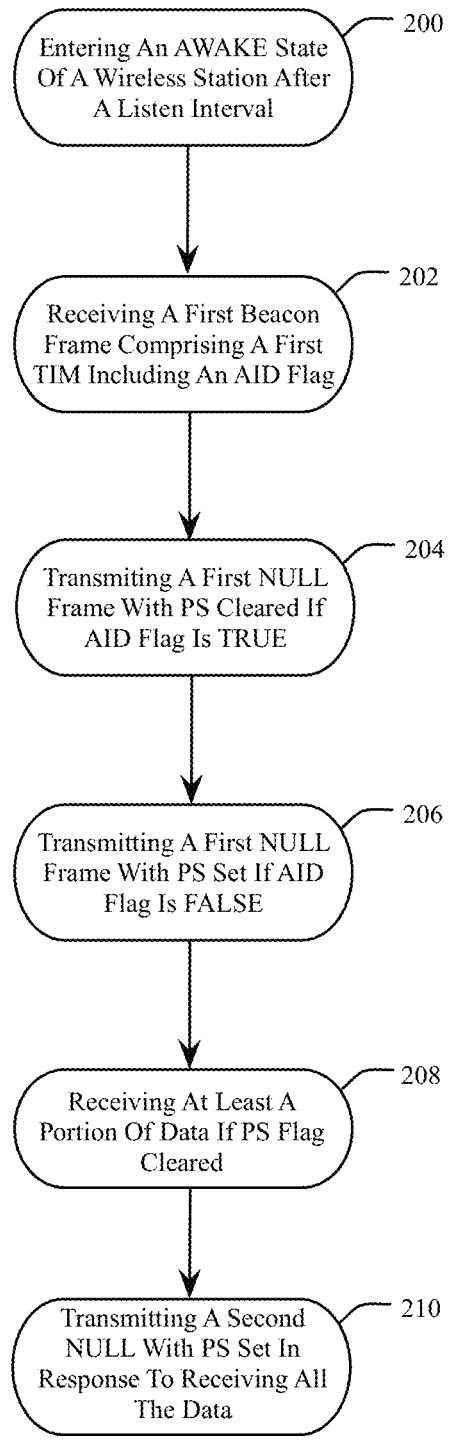
FIG. 3 is a flowchart representation of a method for power save optimization in accordance with an example embodiment of the present disclosure.

FIG. 3 shows an example embodiment of a method for power save optimization. With reference to FIG. 1 and FIG. 2, at 200 an AWAKE state (e.g., the third AWAKE event 100), of a wireless station 10 is entered after the expiration of a listen interval (e.g., the listen interval 64). At 202, the wireless station 10 receives a first beacon frame (e.g., the beacon frame 102), comprising a first TIM including an AID flag. At 204, a first NULL frame is transmitted with PS cleared (to zero) if the AID flag is TRUE. Conversely, at 206, a first NULL frame is transmitted with PS set (to one) if the AID flag is FALSE. At 208, the wireless station 10 receives at least a portion of data if the PS flag is cleared (e.g., the AWAKE state). At 210, the wireless station 10 transmits a second NULL frame (e.g., 114) with PS set (e.g., the DEEP SLEEP state), in response to receiving all the data.

Figure 4:
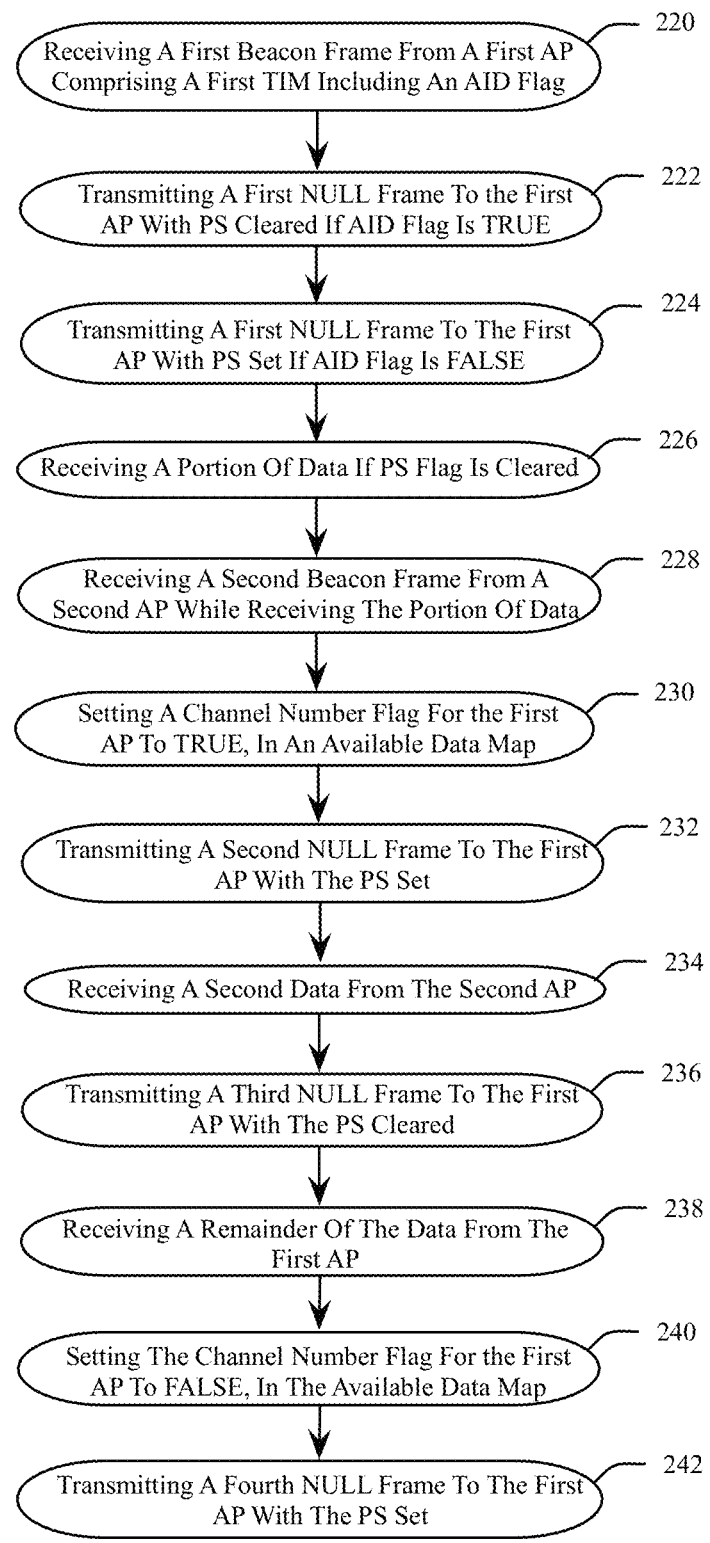
FIG. 4 is a flowchart representation of a method for power save optimization in accordance with an example embodiment of the present disclosure.

FIG. 4 shows an example embodiment of a method for power save optimization. With reference to FIG. 1 and FIG. 2, at 220 a first beacon frame (e.g., 142) is received from a first AP, wherein the first beacon frame comprises a first TIM including an AID flag. At 222, a first NULL frame (e.g., 146), is transmitted to the first AP with the PS flag cleared (e.g., AWAKE) if the AID flag is TRUE. Conversely, at 224, a first NULL frame is transmitted to the first AP with the PS flag set (e.g., DEEP SLEEP), if the AID flag is FALSE. At 226, the wireless station 10 receives a portion of the data (e.g., 150), if the PS flag is cleared.

At 228, the wireless station 10 receives a second beacon frame (e.g., 152) from a second AP while receiving the portion of data. At 230, a channel number flag for the first AP is set to TRUE in an Available Data Map 26. This informs the wireless station 10 that data transfer was incomplete and remaining data is stored at the respective AP. At 232, the wireless station 10 transmits a second NULL frame (e.g., 156), to the first AP with the PS flag set. This suspends further data transfer from the first AP, because the first AP now expects the wireless station 10 to enter the DEEP SLEEP state.

At 234, the wireless station 10 receives the second data (e.g., 164), from the second AP. As described with reference to FIG. 2, in various embodiments, receiving the second data is preceded by transmitting a NULL frame to the AP with the PS flag cleared (e.g., the AWAKE state), and receiving the second data is followed by transmitting a NULL frame to the AP with the PS flag set (e.g., the DEEP SLEEP state). At 236, a third NULL fame is transmitted to the first AP with the PS cleared. This informs the first AP that the wireless station 10 is in the AWAKE mode and ready to resume receiving data from the first AP. At 240, the Channel Number Flag for the first AP is set to FALSE in the Available Data Map 26. At 242, the wireless station 10 transmits a fourth NULL frame to the first AP with the PS flag set.

As will be appreciated, embodiments as disclosed include at least the following. In one embodiment, a wireless station for power save optimization comprises a wake-up subsystem configured by an initial beacon frame from a first Access Point (AP) to define a channel number flag, a listen interval and a first trigger time, wherein the listen interval is an integer number of periods between beacon frames received from the first AP, and the first trigger time is a time when the initial beacon frame is received from the first AP. A transceiver is configured to transition from a DEEP SLEEP state to an AWAKE state to activate at least one of a transmitter and a receiver in response to a wake-up event from the wake-up subsystem. A traffic optimization module comprises an available data map configured to store the channel number flag, wherein the channel number flag is set to a TRUE state when the first AP has a first data stored in a buffer for the wireless station, the first data pending receipt by the wireless station after the wireless station receives a second data from a second AP, and a channel priority arbiter configured to determine a sequence for the wireless station to receive a plurality of buffered data for a respective plurality of APs comprising the first AP and the second AP.

Alternative embodiments of the wireless station for power save optimization include one of the following features, or any combination thereof. The wireless station is configured to scan a plurality of wireless networks to define a list of a plurality of APs meeting a one or more criteria defined by a user-configuration file, wherein the plurality of APs comprises the first AP and the second AP. The user-configuration file comprises a minimum signal strength, a channel number and a Service Set Identifier (SSID). A battery powers at least the transceiver. The transceiver is configured to use a Wi-Fi protocol. A first channel number transmitted by the first AP is different than a second channel number transmitted by the second AP. The wake-up event comprises clearing a Power Save (PS) flag to represent an AWAKE state.

In another embodiment, a method for power save optimization comprises entering an AWAKE state of a wireless station after an expiration of a listen interval of a first Access Point (AP). The wireless station receives a first beacon frame from the first AP, wherein the first beacon frame comprises a first Traffic Indication Map (TIM) including a first Association Identifier (AID) flag corresponding to the wireless station. The wireless station transmits to the first AP, a first NULL frame with one of a Power Save (PS) flag cleared to represent the AWAKE state in response to the first AID flag set to a TRUE state, and the PS flag set to represent a DEEP SLEEP state in response to the first AID flag set to a FALSE state. The wireless station receives at least a portion of a data from the first AP in response to the first AP receiving the first NULL frame with the PS flag cleared to represent the AWAKE state. The wireless station transmits to the first AP, a second NULL frame with the PS flag set to represent the DEEP SLEEP state in response to the wireless station receiving all of the data.

Alternative embodiments of the method for power save optimization include one of the following features, or any combination thereof. The wireless station receives a second beacon frame from a second AP while receiving at least the portion of the data, wherein the second beacon frame comprises a second TIM including a second AID flag corresponding to the wireless station, the second AID flag set to the TRUE state; a channel number flag corresponding to the first AP is set to the TRUE state in an available data map of a traffic optimization module; the wireless station transmits to the first AP, a third NULL frame with the PS flag set to represent the DEEP SLEEP state; the wireless station receives a second data from the second AP; the wireless station transmits to the first AP, a fourth NULL frame with the PS flag cleared to represent the AWAKE state; the wireless station receives a remainder of the data from the first AP, wherein all of the data comprises the portion of the data and the remainder of the data; and the channel number flag corresponding to the first AP is set to the FALSE state in the available data map of the traffic optimization module. A first channel number transmitted by the first AP is different than a second channel number transmitted by the second AP. A plurality of wireless networks with the wireless station is scanned to define a list of a plurality of APs meeting a one or more criteria defined by a user-configuration file, wherein the plurality of APs comprises the first AP. Each of the APs in a list of a plurality of APs with the wireless station is authenticated, wherein the plurality of APs comprises the first AP, the method comprising: receiving an initial beacon frame from a respective AP; configuring a wake-up subsystem with the initial beacon frame to define a channel number flag, a listen interval and a first trigger time, wherein the listen interval is an integer number of periods between beacon frames of the respective AP, and the first trigger time is a time when the initial beacon frame is received from the respective AP; setting the channel number flag of the respective AP to the FALSE state in an available data map of a traffic optimization module, to indicate the absence of a buffered data at the respective AP; and transmitting an initial NULL frame to the respective AP with the PS flag set to instruct the respective AP to begin buffering at least the portion of the data for the wireless station, and remaining in the AWAKE state until the wake-up subsystem of all of the respective APs have been configured. A broadcast data is received from the first AP when the first beacon frame includes a DTIM counter equal to zero and the AID equals zero. A TIMEOUT delay is interposed between receiving all of the data and transmitting the second NULL frame. A transceiver of the wireless station is activated in response to the AWAKE state.

In another embodiment, a method for power save optimization comprises receiving by a wireless station, a first beacon frame from a first Access Point (AP), wherein the first beacon frame comprises a first Traffic Indication Map (TIM) including a first Association Identifier (AID) flag corresponding to the wireless station. The wireless station transmits to the first AP, a first NULL frame with one of a Power Save (PS) flag cleared to represent the AWAKE state in response to the first AID flag set to a TRUE state, and the PS flag set to represent a DEEP SLEEP state in response to the first AID flag set to a FALSE state. The wireless station receives at least a portion of a data from the first AP in response to the first AP receiving the first NULL frame with the PS flag cleared to represent the AWAKE state. The wireless station receives a second beacon frame from a second AP while receiving at least the portion of the data, wherein the second beacon frame comprises a second TIM including a second AID flag corresponding to the wireless station, the second AID flag set to the TRUE state. A channel number flag corresponding to the first AP is set to the TRUE state in an available data map of a traffic optimization module. The wireless station transmits to the first AP, a second NULL frame with the PS flag set to represent the DEEP SLEEP state. The wireless station receives a second data from the second AP. The wireless station transmits to the first AP, a third NULL frame with the PS flag cleared to represent the AWAKE state. The wireless station receives a remainder of the data from the first AP, wherein all of the data comprises the portion of the data and the remainder of the data. The channel number flag corresponding to the first AP is set to the FALSE state in the available data map of the traffic optimization module. The wireless station transmits to the first AP, a fourth NULL frame with the PS flag set to represent the DEEP SLEEP state in response to the wireless station receiving all of the data.

Alternative embodiments of the method for power save optimization include one of the following features, or any combination thereof. A first channel number transmitted by the first AP is different than a second channel number transmitted by the second AP. A broadcast data is received from the first AP when the first beacon frame includes a DTIM counter equal to zero and the AID equals zero. The wireless station transmits to the second AP, a fifth NULL frame with the PS flag cleared to represent the AWAKE state before receiving the second data from the second AP, and the wireless station transmits to the second AP, a sixth NULL frame with the PS flag set to represent the DEEP SLEEP state after receiving the second data from the second AP. A transceiver of the wireless station is activated in response to the AWAKE state.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for power save optimization comprising:
entering an AWAKE state of a wireless station after an expiration of a listen interval of a first Access Point (AP);
receiving by the wireless station, a first beacon frame from the first AP,
wherein the first beacon frame comprises a first Traffic Indication Map (TIM) including a first Association Identifier (AID) flag corresponding to the wireless station;
transmitting by the wireless station to the first AP, a first NULL frame with one of a Power Save (PS) flag cleared to represent the AWAKE state in response to the first AID flag set to a TRUE state, and the PS flag set to represent a DEEP SLEEP state in response to the first AID flag set to a FALSE state;
receiving by the wireless station, at least a portion of a data from the first AP in response to the first AP receiving the first NULL frame with the PS flag cleared to represent the AWAKE state; and
transmitting by the wireless station to the first AP, a second NULL frame with the PS flag set to represent the DEEP SLEEP state in response to the wireless station receiving all of the data;
receiving by the wireless station, a second beacon frame from a second AP while receiving at least the portion of the data,
wherein the second beacon frame comprises a second TIM including a second AID flag corresponding to the wireless station, the second AID flag set to the TRUE state,
setting a channel number flag corresponding to the first AP to the TRUE state in an available data map of a traffic optimization module,
transmitting by the wireless station to the first AP, a third NULL frame with the PS flag set to represent the DEEP SLEEP state,
receiving by the wireless station, a second data from the second AP,
transmitting by the wireless station to the first AP, a fourth NULL frame with the PS flag cleared to represent the AWAKE state,
receiving by the wireless station, a remainder of the data from the first AP, wherein all of the data comprises the portion of the data and the remainder of the data, and
setting the channel number flag corresponding to the first AP to the FALSE state in the available data map of the traffic optimization module.

2. The method of claim 1:
wherein a first channel number transmitted by the first AP is different than a second channel number transmitted by the second AP.

3. The method of claim 1 further comprising
scanning a plurality of wireless networks with the wireless station to define a list of a plurality of APs meeting a one or more criteria defined by a user-configuration file,
wherein the plurality of APs comprises the first AP.

4. The method of claim 1 further comprising
authenticating each of the APs in a list of a plurality of APs with the wireless station, wherein the plurality of APs comprises the first AP, the method comprising:
receiving an initial beacon frame from a respective AP,
configuring a wake-up subsystem with the initial beacon frame to define a channel number flag, a listen interval and a first trigger time,
wherein the listen interval is an integer number of periods between beacon frames of the respective AP, and the first trigger time is a time when the initial beacon frame is received from the respective AP,
setting the channel number flag of the respective AP to the FALSE state in an available data map of a traffic optimization module, to indicate the absence of a buffered data at the respective AP, and
transmitting an initial NULL frame to the respective AP with the PS flag set to instruct the respective AP to begin buffering at least the portion of the data for the wireless station, and remaining in the AWAKE state until the wake-up subsystem of all of the respective APs have been configured.

5. The method of claim 1 further comprising
receiving a broadcast data from the first AP when the first beacon frame includes a DTIM counter equal to zero and the AID equals zero.

6. The method of claim 1 further comprising
a TIMEOUT delay interposed between receiving all of the data and transmitting the second NULL frame.

7. The method of claim 1 further comprising
activating a transceiver of the wireless station in response to the AWAKE state.

8. A method for power save optimization comprising:
receiving by a wireless station, a first beacon frame from a first Access Point (AP),
wherein the first beacon frame comprises a first Traffic Indication Map (TIM) including a first Association Identifier (AID) flag corresponding to the wireless station;
transmitting by the wireless station to the first AP, a first NULL frame with one of a Power Save (PS) flag cleared to represent the AWAKE state in response to the first AID flag set to a TRUE state, and the PS flag set to represent a DEEP SLEEP state in response to the first AID flag set to a FALSE state;
receiving by the wireless station, at least a portion of a data from the first AP in response to the first AP receiving the first NULL frame with the PS flag cleared to represent the AWAKE state;
receiving by the wireless station, a second beacon frame from a second AP while receiving at least the portion of the data, wherein the second beacon frame comprises a second TIM including a second AID flag corresponding to the wireless station, the second AID flag set to the TRUE state;
setting a channel number flag corresponding to the first AP to the TRUE state in an available data map of a traffic optimization module;
transmitting by the wireless station to the first AP, a second NULL frame with the PS flag set to represent the DEEP SLEEP state;
receiving by the wireless station, a second data from the second AP;
transmitting by the wireless station to the first AP, a third NULL frame with the PS flag cleared to represent the AWAKE state;
receiving by the wireless station, a remainder of the data from the first AP, wherein all of the data comprises the portion of the data and the remainder of the data;
setting the channel number flag corresponding to the first AP to the FALSE state in the available data map of the traffic optimization module; and
transmitting by the wireless station to the first AP, a fourth NULL frame with the PS flag set to represent the DEEP SLEEP state in response to the wireless station receiving all of the data.

9. The method of claim 8
wherein a first channel number transmitted by the first AP is different than a second channel number transmitted by the second AP.

10. The method of claim 8 further comprising
receiving a broadcast data from the first AP when the first beacon frame includes a DTIM counter equal to zero and the AID equals zero.

11. The method of claim 8 further comprising
transmitting by the wireless station to the second AP, a fifth NULL frame with the PS flag cleared to represent the AWAKE state before receiving the second data from the second AP, and
transmitting by the wireless station to the second AP, a sixth NULL frame with the PS flag set to represent the DEEP SLEEP state after receiving the second data from the second AP.

12. The method of claim 8 further comprising
activating a transceiver of the wireless station in response to the AWAKE state.

13. A wireless station for power save optimization configured to operate according to the method of claim 8, further comprising:
a wake-up subsystem configured by the first beacon frame from the first Access Point (AP) to define the channel number flag, a listen interval and a first trigger time,
wherein the listen interval is an integer number of periods between beacon frames received from the first AP, and the first trigger time is a time when the first beacon frame is received from the first AP;
a transceiver configured to transition from a DEEP SLEEP state to an AWAKE state to activate at least one of a transmitter and a receiver in response to a wake-up event from the wake-up subsystem;
wherein the transceiver is configured to receive the first data from the first AP and the second data from a second AP; and
the traffic optimization module including:
the available data map configured to store the channel number flag,
wherein the channel number flag is set to a TRUE state when the first AP has the first data stored in a buffer for the wireless station, the first data pending receipt by the wireless station in response to the wireless station receiving the second data from the second AP, and
a channel priority arbiter configured to determine a sequence for the wireless station to receive a plurality of buffered data for a respective plurality of APs including the first AP and the second AP.

14. The wireless station of claim 13
wherein the wireless station is configured to scan a plurality of wireless networks to define a list of a plurality of APs meeting a one or more criteria defined by a user-configuration file,
wherein the plurality of APs comprises the first AP and the second AP.

15. The wireless station of claim 14
wherein the user-configuration file comprises a minimum signal strength, a channel number and a Service Set Identifier (SSID).

16. The wireless station of claim 13 further comprising a battery to power at least the transceiver.

17. The wireless station of claim 13
wherein the transceiver is configured to use a Wi-Fi protocol.

18. The wireless station of claim 13
wherein a first channel number transmitted by the first AP is different than a second channel number transmitted by the second AP.

19. The wireless station of claim 13
wherein the wake-up event comprises clearing a Power Save (PS) flag to represent an AWAKE state.

20. A wireless station for power save optimization, comprising:
wherein the wireless station is configured to receive a first beacon frame from a first Access Point (AP);
wherein the first beacon frame includes a first Traffic Indication Map (TIM) indicating that a first data set is ready to be transmitted from the first AP to the wireless station;
wherein the wireless station is configured to set a Power Save (PS) flag to an AWAKE state and then to transmit the PS flag to the first AP;
wherein the wireless station is configured to receive a portion of the first data set from the first AP in response to the PS flag set to the AWAKE state;
wherein the wireless station is configured to receive a second beacon frame from a second AP while receiving the portion of the first data set;
wherein the second beacon frame includes a second TIM indicating that a second data set is ready to be transmitted from the second AP to the wireless station;
wherein in response to receiving the second beacon frame, the wireless station is configured to set the PS flag to a DEEP SLEEP state and then to transmit the PS flag to the first AP;
wherein the wireless station is configured to receive the second data set from the second AP after having transmitted the PS flag set to the DEEP SLEEP state to the first AP;
wherein after receiving the second data set, the wireless station is configured to set the PS flag back to an AWAKE state and then to transmit the PS flag to the first AP;
wherein the wireless station is configured to receive a remainder of the first data set from the first AP in response to the PS flag set back to the AWAKE state;
wherein in response to receiving the remainder of the first data set, the wireless station is configured to set the PS flag back to the DEEP SLEEP state and then to transmit the PS flag to the first AP.

21. The wireless station of claim 20:
further comprising a traffic optimization module including an available data map which itself includes a set of channel number flags corresponding to at least the first AP and the second AP;
wherein the wireless station is configured to set the channel number flag for the first AP to TRUE after receiving the portion of the first data set but before receiving the remainder of the first data set.

* * * * *